F. VAN FLEET.
Chucks.
No. 152,779.  Patented July 7, 1874.
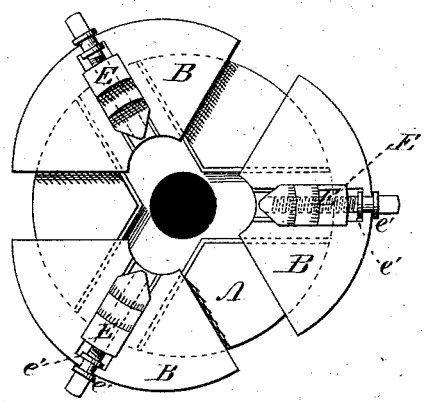
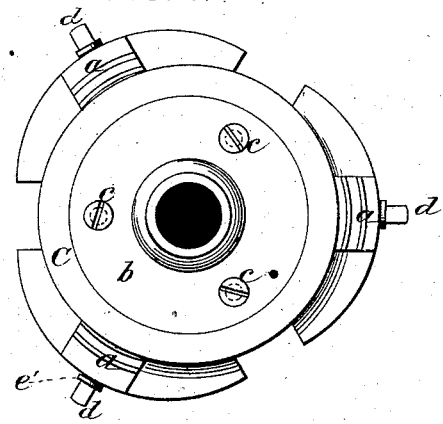 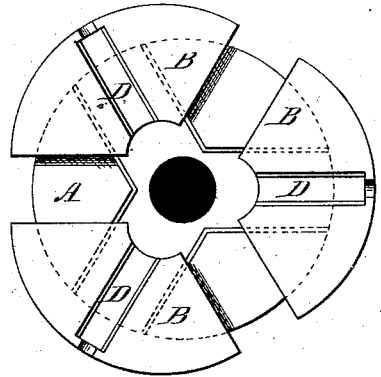
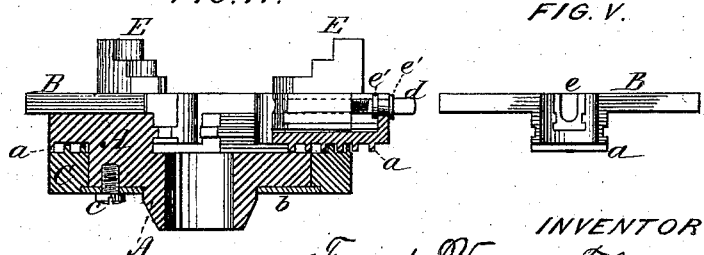
WITNESSES:
A. H. Norris
Harry C. Birch
INVENTOR:
Fred. Van Fleet.
By James L. Norris,
Atty.

UNITED STATES PATENT OFFICE.

FREDERICK VAN FLEET, OF WATSONTOWN, PENNSYLVANIA.

IMPROVEMENT IN CHUCKS.

Specification forming part of Letters Patent No. 152,779, dated July 7, 1874; application filed May 5, 1874.

*To all whom it may concern:*

Be it known that I, FREDERICK VAN FLEET, of Watsontown, in the county of Northumberland and State of Pennsylvania, have invented certain new and useful Improvements in Expanding Lathe-Chuck, of which the following is a specification:

This invention relates to certain improvements in lathe-chucks, in which the dogs are capable of radial adjustment by means of a scroll-faced ring, adapted to threads in boxes, carrying the dogs in such a manner that, by turning said ring in one or the other direction, the dogs are correspondingly adjusted for admitting of the convenient adjustment of the chuck to concentric or eccentric work, as shown in the patent to J. H. Westcott, dated February 25, 1873, No. 136,349. This invention consists in constructing the face-plate of the chuck of three sections or parts, each provided with a tongue on its lower face, having screw-threads formed thereon, which are adapted to a scroll-faced ring on the body of the chuck, for adjusting the sections radially. The said plates forming the face-plate of the chuck carry the dogs, which are adjustable radially by means of set-screws passing through openings in the body of the dogs, the said sliding sections and the dogs being capable of adjustment independent of each other, whereby, when the sliding sections have been adjusted to their outer limit, the dogs can be afterward adjusted outwardly, and thus the chuck can be expanded to a much greater extent than heretofore.

Figure 1 is a top or plan view, showing the face-plate expanded, and dogs in position thereon; Fig. 2, a bottom view thereof; Fig. 3, a plan view, showing the face-plate expanded with the dogs removed; Fig. 4, a transverse central section of the chuck; Fig. 5, a detached view of one of the sections of the face-plate.

The body A of the chuck is provided with a face-plate, which is constructed of three sections or parts, B B, and said sections are provided on their inner face with rectangular tongues, adapted to corresponding recesses in the body of the chuck, and having on their face screw-threads *a*, which are adapted to a scroll-faced ring, C, arranged around the periphery of the chuck, and confined in place by a ring or disk, *b*, secured on the body of the chuck by screws *c*, and said ring or disk overlapping the scroll-faced ring C, to permit the latter to revolve freely. The sections B of the face-plate of the chuck are provided with rectangular recesses D, in which are arranged the sliding dogs E, so as to move with the sections of the face-plate. In the lower portions of the body of the dogs are formed screw-threaded openings, in which work the screw-bolts *d*, by which the dogs are adjusted. The sections B of the face-plate are provided with vertical slots *e*, of a size less than the rectangular recess D, which is for the purpose of confining in place the screw-bolts *d*, which latter are provided with two collars, *e' e'*, for this purpose.

The sections B of the face-plate of the chuck are always retained in a concentric position, with respect to the center of the chuck, by means of the scroll-ring C, by which they are adjusted radially; and the dogs may be conveniently adjusted by their screw-bolts to adapt the chuck to concentric or eccentric work.

The dogs E are guided and retained in place in the adjustable sections of the face-plate of the chuck, with freedom of radial adjustment, either collectively or separately, by means of grooves on the same, and a corresponding construction of ribs on the sections B.

In the operation of the chuck, the turning of the scroll-faced ring effects a universal radial adjustment of the sections B of the face-plate, and afterward the dogs E have a radial movement independent of the sections.

With a chuck in which the face-plate is constructed of adjustable sections carrying the adjustable dogs, as above described, when the sections of the face-plate have been adjusted to their outward limit, the dogs then have a movement independent of the sections, and the chuck can be expanded to a much greater degree than heretofore.

I disclaim the invention illustrated in the patent of Westcott, before referred to.

I claim as my invention—

The face-plate of the chuck, constructed of the radially-sliding sections B, having recesses D, in combination with the dogs E, arranged in the recesses, and with the scroll-faced ring C, the whole being constructed, and the sliding sections and dogs being capable of adjustment independent of each other, substantially as described, and for the purpose specified.

In testimony that I claim the foregoing I have hereunto set my hand and seal this 14th day of March, 1874.

FRED. VAN FLEET. [L. S.]

Witnesses:
 THOMAS WALTER HARDY,
 THOMAS B. MCCARTHY.